Jan. 27, 1970   L. T. FLEISCHER ET AL   3,491,709

MINIMUM TILLAGE MACHINE

Filed Sept. 26, 1966   3 Sheets-Sheet 1

INVENTORS
LEONARD T. FLEISCHER
ROY R. McGEE
BY
N. Robert Henderson
ATTORNEY

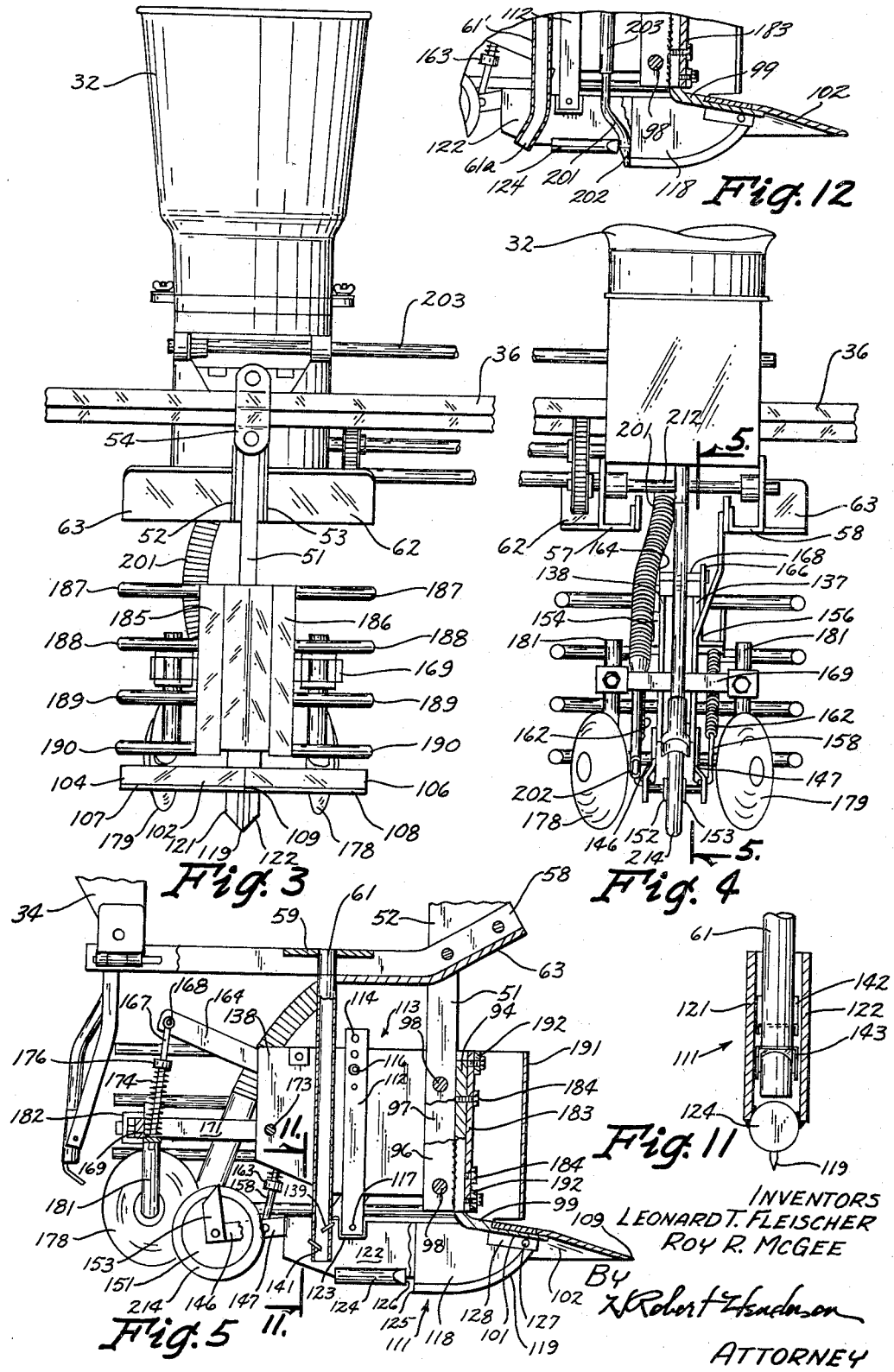

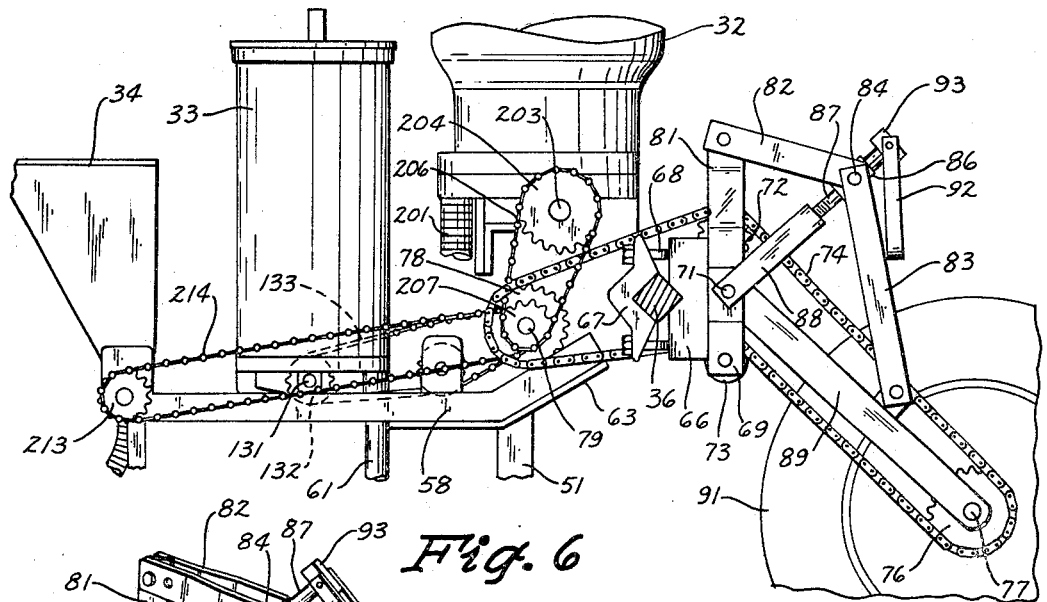
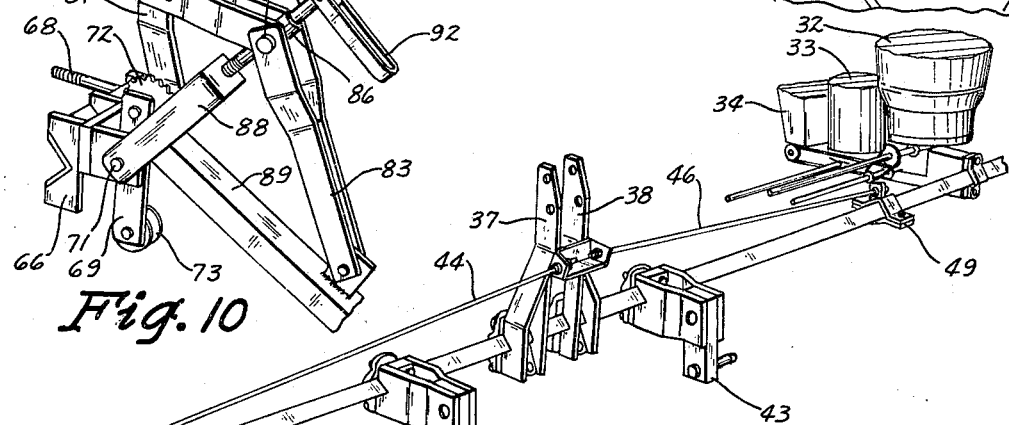
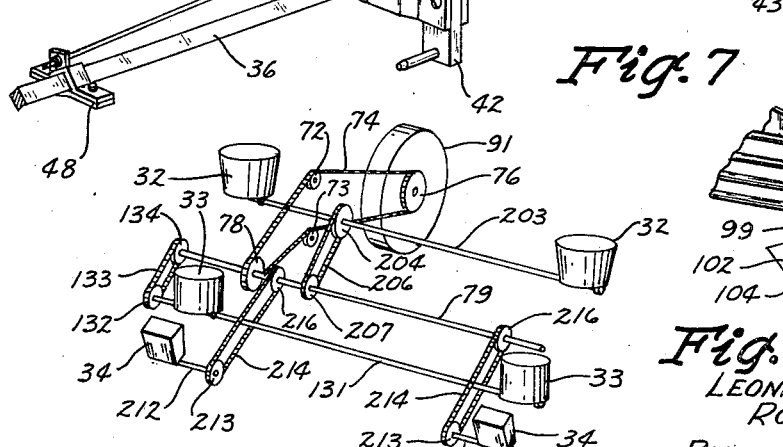
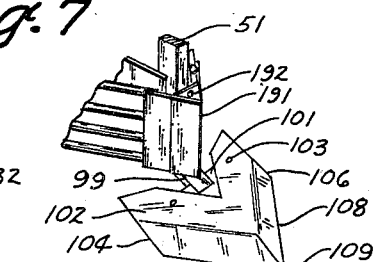
Fig. 6, Fig. 7, Fig. 8, Fig. 9, Fig. 10
INVENTORS
LEONARD T. FLEISCHER
ROY R. McGEE
BY
ATTORNEY

United States Patent Office 3,491,709
Patented Jan. 27, 1970

3,491,709
MINIMUM TILLAGE MACHINE
Leonard T. Fleischer, 315 Pershing Road, and Roy R. McGee, 3009 27th St., both of Columbus, Nebr. 68601
Filed Sept. 26, 1966, Ser. No. 581,856
Int. Cl. A01c 5/06
U.S. Cl. 111—85              4 Claims

ABSTRACT OF THE DISCLOSURE

This invention comprises an improved minimum tillage machine comprising a ground engaging frame attachment for the rear of a tractor, which attachment carries a plurality of individual units, each of which includes a sweep, a sub-soiler including a shoe having a pair of vertically disposed plates converging from their toward and forming a point with an elongated bar having a semicircularly formed bottom surface being secured to the bases of the plates and disposed lengthwise to the direction of the movement of the machine, a seed planter having a conduit the lower end of which is disposed between the plates and immediately in front of the leading edge of the bar, a pressing wheel for pressing the seed in the furrow firmly into the soil, a pair of discs immediately behind the pressing wheel for pushing loose soil over the furrow and on top of the seed placed therein, and a guard mounted on the frame of each unit and disposed to both sides thereof, and further wherein the frame includes strengthening bars attached to a bracket for engaging the tractor, and also further wherein the wheel units include tension adjustment elements for the fertilizer hopper box chains.

---

The present invention relates to an improved machine which incorporates the functions of minimum tillage, and contemplates the provision of a tractor-towed planter which is particularly useful in preparing seed beds in fields on which heavy crop residue, i.e., trash, remains after previous harvesting of the particular crop.

Tillage research principles used in developing the present machine and till-plant system include: reducing tillage operations to a minimum without affecting stand, weed control, or crop yield; packing soil at seed level and covering with loose soil for rapid germination and uniform stand; reducing soil compaction by reducing the number of field trips and tillage operations; leaving residue on the surface to reduce wind and water erosion hazard; eliminating tillage prior to planting and reducing tillage to a minimum at planting in order to keep the soil moisture evaporation losses to a minimum; and planting in ridge to place seed in warmer, better drained soil.

The present embodiment of till planter is utilized to plant all row crops, such as corn, sorghum (milo), and beans. It is designed to plant evenly and efficiently in fields with trash on the surface, and has also been used in surface planting on plowed ground and on alfalfa ground. It is designed to operate efficiently under all these conditions with a minimum of adjustment.

The present till planter attaches to all three-plow or larger tractors with two- or three-point hitches. Fertilizer, insecticides, and herbicides can be applied according to recommended practices, just as in conventional planting. The standard unit is adjustable 36-inch to 40-inch rows, with 30-inch row spacing also available.

It is therefore an object of this invention to provide an improved machine of this type functioning to achieve the aforementioned results.

Another object of the present invention is to provide an improved machine of this type characterized by the fact that a sweep having a particular pitch is utilized to provide the proper suck and soil penetration.

Another object of this invention is to provide a new machine of this character which functions to clean the rows of stumps, trash, and residue, pushing such material to one side for a clean planting area of approximately ten inches.

Yet another object of this invention is to provide a machine of this type which utilizes a sub-soiler shoe that cuts and makes a narrow furrow for accurate placement of the seed, and wherein the seed is placed evenly in the furrow due to an improved seeding device.

Still another object of this invention is to provide an improved machine of this character in which a zero pressure inch tire mounted on a spring loaded firming wheel firmly presses the seed into the soil, providing for a better stand.

Still another object of this invention is to provide an improved machine of this type wherein an adjustable disc unit places a cover of clean, loose soil over the seed placed in the furrow, which area had previously been cleaned by the sweep which removed the weed seed and volunteer grain from the seed bed.

Yet another object of this invention is to provide a machine of this character wherein a definite savings in labor is obtained.

Another object of this invention is to provide an improved machine of this character wherein insecticides and herbicides may be applied according to recommended practices, and fertilizer may also be applied according to the soil test requirements.

Still another object of this invention is to provide a machine capable of attaining the objects designated hereinbefore which is economical to manufacture, simple but rugged in structure, and effective in operation.

These objects, and other features of this invention will be more readily apparent upon reference to the following description when taken in consideration with the accompanying drawings, wherein:

FIG. 3 is a front elevational view of the unit of FIG. 2 as taken along the line 3—3 in FIG. 2;

FIG. 4 is a rear elevational view of the unit of FIG. 2, as taken along the line 4—4 in FIG. 2;

FIG. 5 is a vertical sectional view taken along the line 5—5 in FIG. 4, certain parts being broken away for clarity of illustration;

FIG. 6 is a fragmentary, side elevational view as seen along the line 6—6 in FIG. 1;

FIG. 7 is a perspective, fragmentary view of a portion of the frame means of the planter machine;

FIG. 8 is a schematic reduced view of the driving mechanism for the insecticide, herbicide, and fertilizer hoppers of the machine;

FIG. 9 is a fragmentary, perspective view of the sweep structure of the machine;

FIG. 10 is a fragmentary, perspective view of an adjustment mechanism for one of the wheels for the machine;

FIG. 11 is an enlarged, sectional view taken along the line 11—11 in FIG. 5; and FIG. 12 is a fragmentary, sectional view similar to the lower portion of FIG. 2, and showing a modified arrangement thereof.

Figure 1:
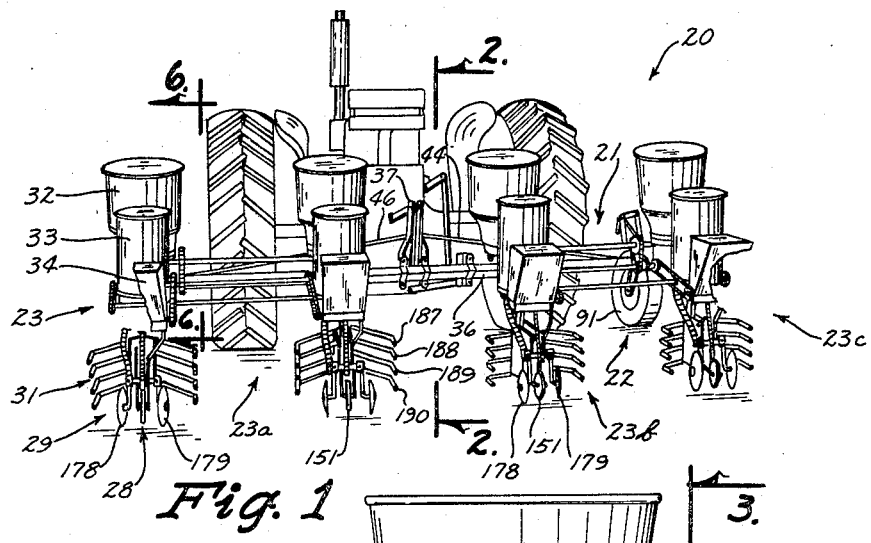
FIG. 1 is a perspective view of the improved planter of this invention shown in assembled relationship to a conventional prime mover, such as a tractor.

Referring to the drawings, and particularly FIG. 1, the minimum tillage machine of this invention is indicated generally at 20 and comprises basically a frame unit 21 a pair of wheel units 22, only one of which is seen in FIG. 1, and a quartet of sub-frame assemblies 23, 23a, 23b, and 23c.

Each sub-frame assembly comprises a sweep unit 24 (FIG. 2), a sub-soiler unit 26, a seed planting unit 27, a pressing unit 28, a disc unit 29, and a guard unit 31. Mounted on top of each sub-frame assembly is a fertilizer hopper 32 (FIG. 2), a seed hopper 33, and an insecticide hopper 34.

Figure 2:
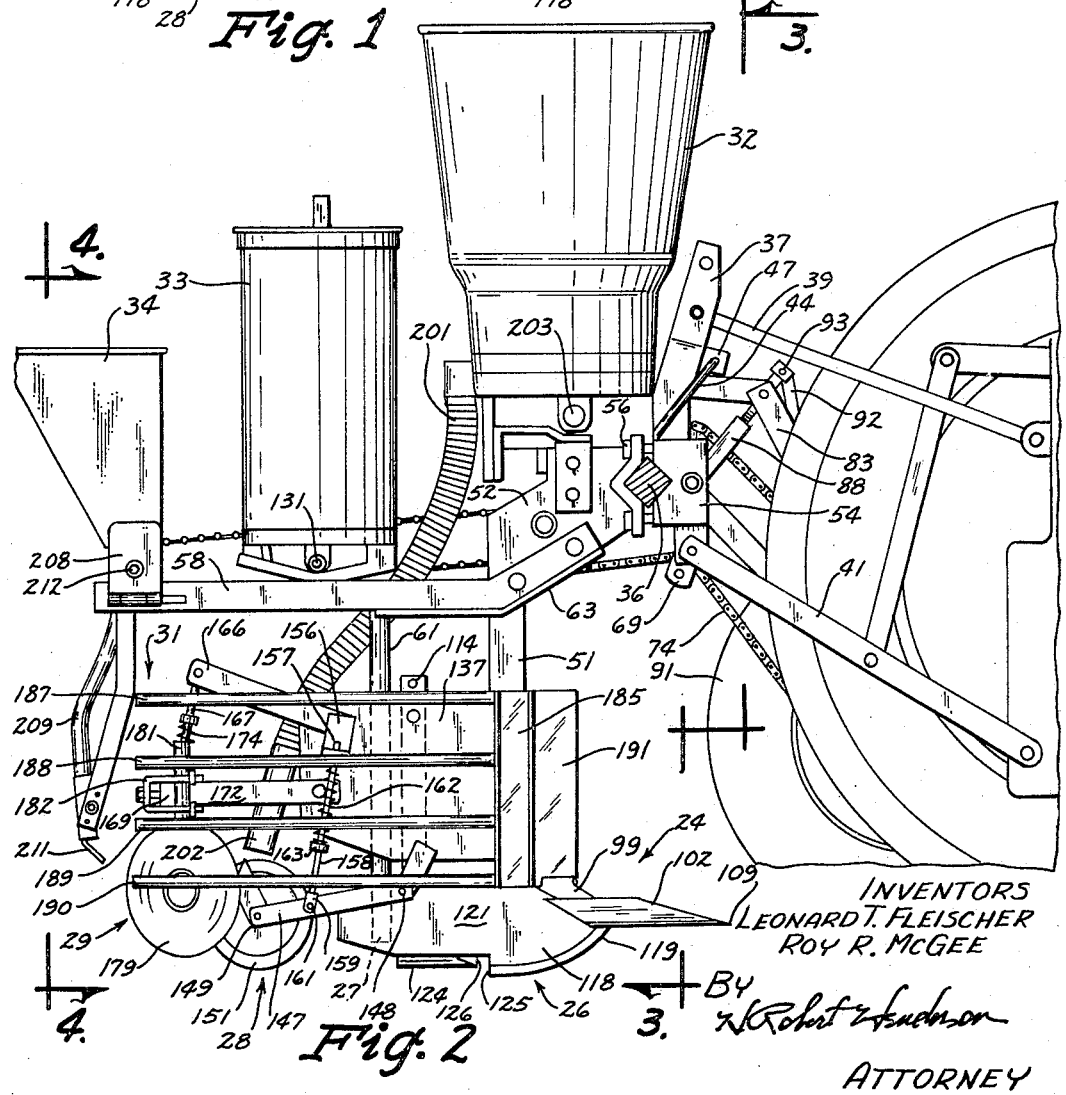
FIG. 2 is an enlarged, side elevational view of one of the four planter units shown as a part of the machine, as taken along the line 2—2 in FIG. 1.

More specifically, the frame unit 21 comprises an elongated tool bar 36 (FIG. 2 and 7) on which are mounted a pair of upright brackets 37 and 38 (FIG. 7) at the center thereof. These brackets are connected to a lift arm 39 (FIG. 2) which is part of a conventional tractor A frame, and which also includes a pair of rock arms 41, only one of which is shown in FIG. 2.

For the purpose of strengthening the tool bar structure, a pair of elongated, straight truss rods 44 and 46 (FIG. 7) are interconnected as illustrated between a single interconnector 47 secured to the upright brackets 37 and 38, and a pair of brackets 48 and 49 (FIG. 7) secured on opposite sides of the brackets 37 and 38 to the tool bar 36.

As each sub-frame assembly is identical, only one will be described herein with like parts indicated by like reference numerals. A sub-frame assembly comprises an upright beam 51 (FIG. 2 and 5) held between a pair of plates 52, 53 (FIG. 3) which are bolted to the tool bar 36 by a single clamp 54, as by bolts 56.

Extended rearwardly from the plates 52, 53 is a yoke-like support comprising a pair of parallel brackets 57, 58 (FIG. 4) secured to the side surfaces of the plates 52, 53 respectively, and between which is inserted a spacer plate 59 (FIG. 5) through which an elongated tube 61 for the passage of seed therethrough is inserted. Shields 62 and 63 (FIGS. 3 and 4) are secured to the brackets 57, 58 for deflecting soil and debris thrown upwardly by movement of the machine 20.

As each ground engageable wheel unit 22 is also identical, only one will be described with like parts indicated by like reference numerals. Each wheel unit 22 (FIGS. 6 and 10) comprises an H-type tool bar mounting block 66 secured to the tool bar 36 adjacent an end thereof by means of a clamp 67 and bolts 68 therefor. Pivotally mounted to the block 66 is a pivot arm 69, as by a pivot pin 71, the arm 69 having rotatably mounted at its upper end a sprocket 72 and at its lower end a spool 73. For transmitting drive, a continuous chain 74 is trained over both the sprocket 72 and a spool 73, being in mesh with the sprocket 72. The chain 74 is in mesh with a sprocket 76 (FIG. 6) drivingly secured to the end of an axle 77, and trained over another sprocket 78 which in turn rotates a shaft 79 (FIGS. 6 and 8).

Also mounted on the block 66 is an upright, offset brace 81, the upper end of which is pivotally connected to an inner yoke 82, in turn pivotally connected to an outer yoke 83 by means of a pin 84 inserted through both yokes 82 and 83, and through a jackscrew nut 86. The nut 86 is threadably engaged with a jackscrew 87 the lower end of which is threaded into a U-shaped bracket 88 pivotally connected to the mounting block 66. Also pivotally secured to the block 66 is an elongated support 89 extended to and pivotally connected to the wheel axle 77, and intermediate the ends of which the lower end of the outer yoke 83 is pivotally secured.

The action of the wheel unit 22 is such that upon movement of the wheel 91 relative to the terrain, tension on the drive chain 74 is maintained at a proper amount at all times. Such tension can be adjusted by rotation of the jackscrew 87 by means of a handle 92 secured at its exposed end 93.

Referring particularly to FIGS. 2, 5 and 9, the sweep unit 24 of this invention includes an upright bar 94 secured between a pair of side bars 96, 97, the latter in turn being mounted to the side of the upright beam 51 by a plurality of bolts 98. The lower end of the sweep bar 94 is turned outwardly at 99 (FIG. 5) and has secured thereto a sweep support 101. A sweep blade 102 is secured to the support 101 by a least a pair of bolts 103 (FIG. 9).

The blade 102 is formed by a pair of parallel, straight side edges 104, 106 defining a substantially flat surface, and leading to a pair of converging front edges 107, 108 which converge to a point 109. As best illustrated in FIG. 5, the portion of the blade 102 between the converging front edges 107 and 108 has approximately a 7° pitch relative to the horizontal.

The sub-soiler unit 26 is best illustrated in FIGS. 2, 5 and 11 and includes a shoe device 111 pivotally attached at its forward end to the sweep unit 24 and adjacent its rear end to a standard 112. The standard 112 is connected to a pressing and disc frame 113, and is provided with vertically spaced holes 114 for adujustable connection by means of a pin 116 to the frame 113. At the lower end of the standard 112, a pivot pin 117 is provided for pivotal attachment to the shoe device 111.

The shoe itself comprises a single, substantially flat lead plate 118 having a cutting edge 119 curvedly depending from the point thereof toward the rear of the shoe device 111, and including further a pair of parallel plates 121 and 122 (FIG. 11). The latter plates are joined at 124 at their forward portions and extend rearwardly therefrom in laterally spaced relation. A pair of mounting pads 123 (FIG. 5) are provided on the inside surface of each plate 121, 122 for pivotal attachment to the lower end of the standard 112.

Secured to the lower edges of the plates 121 and 122 so as to depend therefrom is a horizontally disposed, elongated furrow forming bar 124 having a leading knife edge 126 positioned slightly behind th emerge portion 125 of the plates. The bar is disposed axially of the direction of movement of the machine, and it will be noted, has a simi-circular undersurface (see FIG. 11). The forward end of the shoe device 111 is pivotally connected at 127 to a bracket 128 secured beneath the sweep support 101 for providing adjustment of the depth of the subsoiler device.

The seed planting unit 27 of this invention includes the seed hopper 33 (FIGS. 2 and 6) which is operated by a horizontally disposed shaft 131 (FIG. 8) at its base structure, the shaft 131 interconnected between all four hoppers 33. At one end of the shaft 131, a sprocket 132 is mounted which receives drive via an endless chain 133 from another sprocket 134 fastened on the end of the shaft 79 which receives drive from the wheel 91.

Depending from the hopper 33 for transmitting seed is the hollow seed tube 61 (FIG. 5) which depends between a pair of substantially rectangular, vertically disposed flat plates 137, 138 secured at their front ends to either side of the beam 51 and extended rearwardly therefrom in parallel spaced relation (see FIG. 4). To provide for proper placement of the seed, the lower end of the tube 61 is provided with an upper slit 139 (FIG. 5) formed in an angularly depending manner in the tube, and with a lower slit 141 also formed in an angularly depending manner and extended at a right angle to the upper slit 139. It will be noted that both slits extend substantially one-half the width of the tube 61.

Within each slit, as best illustrated in FIG. 11, is placed a U-shaped deflector, 142 and 143, respectively, whereby the depending legs of each deflector extend on the outside of the respective slit, and with a main portion of each deflector extended thereby into the tube 61 as best illustrated in FIG. 5. By this arrangement, the fall of the seed through the tube 61 is broken such that proper dispersal of the seed is made.

To provide means for firmly pressing the seed in the furrow into the soil, the pressing unit 28 is provided. This unit 28 comprises a yoke including a pair of rearwardly extended, offset pivot arms 146, 147 (FIGS. 2 and 4), each of which is pivotally connected at 148 to a respective plate 137 and 138. The outer ends 149 of the arms 146, 147 have journaled therebetween a pressing wheel 151 the outer rim 214 of which is of a hard rubber or the like. A pair of angularly offset guide brackets 152, 153 are provided for maintaining the wheel 151 in true alignment therebetween.

To spring load the firming or pressing wheel 151, each plate 137 and 138 has an L-shaped bracket 154 and 156 (FIG. 4), respectively, mounted thereon through each of which the upper end 157 of a rod 158 extends. Each upper end 157 is provided with a stop means (not shown) which limits the downward movement of the rod 158 through an opening provided therefore in the respective bracket. The lower end 159 of each rod 158 is connected by a pivoted joint 161 to a respective arm 146 and 147; and by means of a spring 162 interposed between each bracket 154 or 156 and a washer 163 (FIG. 2) secured to a rod 158, a continual downwardly biased force is maintained against the pressing wheel 151.

The disc unit mounted on the frame 21 for pushing loose soil over the furrow and on top of the seed placed therein includes a pair of rearwardly extended, parallel arms 164, 166 (FIGS. 2 and 5) the inner end of each of which is secured to the outer surface of one of the plates 137 and 138. Pivotally mounted between the outer ends of the arms 164 and 166 is a vertically depending rod 167 the upper end of which has a horizontally disposed journal 168 integral therewith.

The lower end of the rod 167 is connected to a horizontally disposed, transversely extended mounting bar 169 (FIG. 4) which is in turn secured to the outer ends of a pair of straps 171, 172 pivoted at 173 to the plates 137, 138 as best illustrated in FIG. 5. A compression spring 174 (FIG. 5) is interposed between a limit nut 176 mounted adjacent the upper end of the rod 167 and the lower end of the rod adjacent the mounting bar 169. On each end of the bar 169 a disc 178 and 179 is respectively mounted by means of an upright standard 181 inserted through a clamp unit 182 in turn secured to the mounting bar 169.

To clean rows of stumps, trash and other residue away to either side of the planting area is the purpose of the guard unit 31. This unit includes an upright, V-shaped piece 183 (FIG. 5) secured to the face of the vertical bar 94, as by bolts 184, and having a pair of rearwardly extending, outwardly diverging wings 185 and 186 (FIG. 3).

Secured to the wings in vertically spaced relation, extending outwardly therefrom in a diverging manner, and then extending rearwardly in a straight manner as best illustrated in FIGS. 2–4 inclusive, are a quartet of guard bars 187, 188, 189 and 190 provided on each side of so as to enclose the subsoiler unit 26, seed planting unit 27, pressing unit 28, and disc unit 29. The guard unit is completed by a V-shaped nose piece 191 (FIGS 2 and 3), internally secured as by bolts 192 (FIG. 5) to the upright piece 183.

Referring to FIGS. 2 and 4, it will be noted that fertilizer is disposed from the hopper 32 by a flexible tube 201, the lower end 202 of which is closely adjacent the pressing wheel 151. The fertilizer hopper 32 is actuated relative to dispersing fertilizer therefrom by means of a shaft 203 (FIGS. 3 and 8), which shaft extends horizontally across the entire machine for operative connection between each hopper 32. Drive is imparted to the shaft 203 by means of a sprocket 204 (FIG. 6) mounted thereon, which is rotated by a continuous chain 206 driven by another sprocket 207 mounted on the driven shaft 79.

Likewise, the insecticide hopper 34 is provided with a mounting bracket 208 (FIG. 2) at the rear end of the yoke support brackets 57, 58 and which is operated to transmit insecticide through a depending tube 209 with a nozzle 211 at the bottom thereof disposed directly over a completed furrow by a horizontally disposed stub shaft 212 (FIG. 8). Each stub shaft 212 is driven at one end by a sprocket 213 (FIG. 4) in mech with a continuous chain 216 which is driven by a sprocket 217 securely mounted to the wheel driven shaft 79 (FIG. 8).

Relative to the operation of each subframe assembly 23, 23a, 23b, 23c, the front mounted sweep is operable to cut stumps and remove the residue and weeds from the old row. With the sweep blade 102 having a seven degree pitch, the proper suck and penetration of the soil is provided. The blade runs at a depth which cuts the full width of the sweep. In the instant embodiment, the sweep blade 102 is approximately sixteen inches in width. Where there is a very small ridge, or none at all, a depth of the sweep blade of approximately two to two and one-half inches is recommended.

The specially designed subsoiler shoe then cuts and makes a narrow furrow for accurate placement of the seed. Directly behind the furrow forming bar 124 (FIG. 2), seed is placed in the furrow by the particularly designed seed tube 61 and deflection means provided therewith. The deflectors slow down the seed and allows it to be placed evenly in the furrow.

The subsoiler shoe 111 depth depends upon whether the soil is heavy or light. Thus with a heavy soil, the depth should be shallower than with a light soil, where the depth can be deeper. Usually the earlier the planting, the shallower the shoe should run, providing there is ample soil moisture. Planting speeds of three and one-half to five miles per hour have given good results in tests and practical applications to date.

The zero pressure tire 214 mounted on the spring loaded firming wheel 151 subsequently firmly presses the seed into the moist soil for a successful stand. Generally germination is two to three days earlier by the use of this apparatus than under conventional planting. The pressing wheel 151 should run closely behind the subsoiler shoe device 111 (FIG. 5) with enough spring tension to firmly press the seed into the soil.

The adjustable discs 178 and 179 then place a cover of clean, loose soil over the seed in the furrow. The discs should be set so there is approximately two to two and one-half inches of loose soil over the seed bed. It is recommended that the discs 178 and 179 be placed approximately six to seven inches apart in order to bring clean soil over the seed bed.

The application of insecticide and herbicides from the hoppers 34 should be applied according to the recommended practices in the particular area. Fertilizer from the hopper 32 can be either liquid or granular, and is also applied according to soil test requirements of the area.

Referring particularly to FIG. 12, a modification of both the seed tube 61 and the sub-soiler shoe device 111 is shown. Rather than having a straight drop of the seed through the tube 61, which drop is controlled by the deflectors 142 and 143 (FIG. 11), the modified tube 61′ (FIG. 12) is bent at the bottom end 61a, with the lower end 61a adjacent the rear of the furrow forming bar 124. By this arrangement, fall of the seed is slowed down and distribution thereof is quite satisfactory.

The shoe device 111 in FIG. 12 is provided with a vertically disposed, slightly curved conduit 201 inserted between the plates 121 and 122 for transmitting liquid fertilizer through its discharge nozzle 202 which is placed directly in front of the furrow forming bar 124. The conduit 201 is fluidly connected to a vertically disposed tube 203 the upper end (not shown) of which is connected to a conventional liquid fertilizer holding hopper. By this arrangement, liquid fertilizer flowing through the tube 203 and the conduit 201 is placed directly underneath the sub-soiler device 111.

In summation, an improved basic minimum tillage planter machine has been described in detail hereinbefore which when used to plant row crops eliminates the combined operations of plowing, disking and harrowing, and accomplishes the same results with a single movement over and through the soil with the accompanying advantages of having a better stand, an earlier maturity of the grain, and a higher overall yield.

Although a preferred embodiment of this invention has been described hereinbefore, it is not to be so limited, it being remembered that various alterations and modifications may be made thereto without departing from the true spirit and scope of the invention.

I claim:

1. A minimum tillage machine comprising:
frame means adapted for towing attachment to a prime mover;
ground engageable wheel means adjustably mounted on said frame means for movably suspending said frame means over a ground surface;
sweep means mounted on said frame means for sweeping over an old ridge on the ground just below the surface thereof;
subsoiler means mounted on said frame means behind said sweep means for sequentially cutting into the soil of the old ridge to remove roots therefrom, and forming a furrow therein;
seed planting means mounted on said frame means for placing seed within the furrow formed by said subsoiler means;
pressing means mounted on said frame means for pressing the seed in the furrow firmly into the soil;
disk means mounted on said frame means for pushing loose soil over the furrow and on top of the seed placed therein;
guard means mounted on said frame means and disposed to both sides of said subsoiler means, said seed planting means, said packing means, and said disk means for removing residue from the new ridge by pushing it to opposite sides thereof;
and further wherein said wheel means comprises a wheel, a support for said wheel means pivotally mounting said support to said frame means, means for accurately positioning said support relative to said frame means, continuous chain drive means movably connected between said wheel and said frame means, means for maintaining proper tension on said chain means pivotally mounted on said frame means and connected to said pivotally mounting means.

2. A minimum tillage machine comprising:
frame means adapted for towing attachment to a prime mover;
ground engageable wheel means adjustably mounted on said frame means for movably suspending said frame means over a ground surface;
sweep means mounted on said frame means for sweeping over an old ridge on the ground just below the surface thereof;
subsoiler means mounted on said frame means behind said sweep means for sequentially cutting into the soil of the old ridge to remove roots therefrom, and forming a furrow therein, said subsoiler means comprising a shoe including a pair of vertically disposed plates converging from their rear toward and forming a point, the exterior of said point being a leading depending and arcuately rearwardly extended knife edge surface, said shoe being pivotally connected to said frame means, and the rearward end thereof is vertically adjustably connected to said frame means, an elongated bar having a semicircularly formed bottom surface in cross section being secured to the bases of said plates, disposed lengthwise to the direction of moevment of the machine and behind said knife edge surface;
pressing means mounted on said frame means for pressing the seed in the furrow firmly into the soil;
disk means mounted on said frame means for pushing loose soil over the furrow and on top of the seed placed therein; and
guard means mounted on said frame means and disposed to both sides of said subsoiler means, said seed planting means, said packing means, and said disk means for removing residue from the new ridge by pushing it to opposite sides thereof.

3. A minimum tillage machine as defined in claim 1, and further wherein said tension maintaining means includes a pivotally mounted elongated member having a pair of rotatable elements at opposite ends thereon, said chain means trained over both said elements.

4. A minimum tillage machine as defined in claim 2, and further wherein a substantially vertically disposed hollow conduit is inserted between said plates with a lower end thereof placed immediately in front of the leading edge of said bar relative to the direction of movement of the machine.

References Cited

UNITED STATES PATENTS

| | | | |
|---|---|---|---|
| 211,601 | 1/1879 | Springer | 111—85 |
| 742,872 | 11/1903 | Jacobs | 111—83 |
| 2,351,173 | 6/1944 | White | 111—85 |
| 2,704,499 | 3/1955 | Radway | 172—720 X |
| 2,755,751 | 7/1956 | Beilke | 111—85 X |
| 2,764,111 | 9/1956 | Collins | 111—86 X |
| 2,869,491 | 1/1959 | Orendorff | 111—85 X |
| 2,963,998 | 12/1960 | Bliss | 111—85 |
| 3,237,702 | 3/1966 | Orendorff | 111—85 X |
| 3,330,364 | 7/1967 | Orthman | 172—451 |

FOREIGN PATENTS

| | | |
|---|---|---|
| 42,040 | 4/1910 | Austria. |

ROBERT E. BAGWILL, Primary Examiner

ALAN E. KOPECKI, Assistant Examiner

U.S. Cl. XR.

111—36, 86